June 12, 1928.
E. F. ANDREWS
ELECTROLYTIC CONDENSER
Filed Nov. 7, 1927
1,673,434
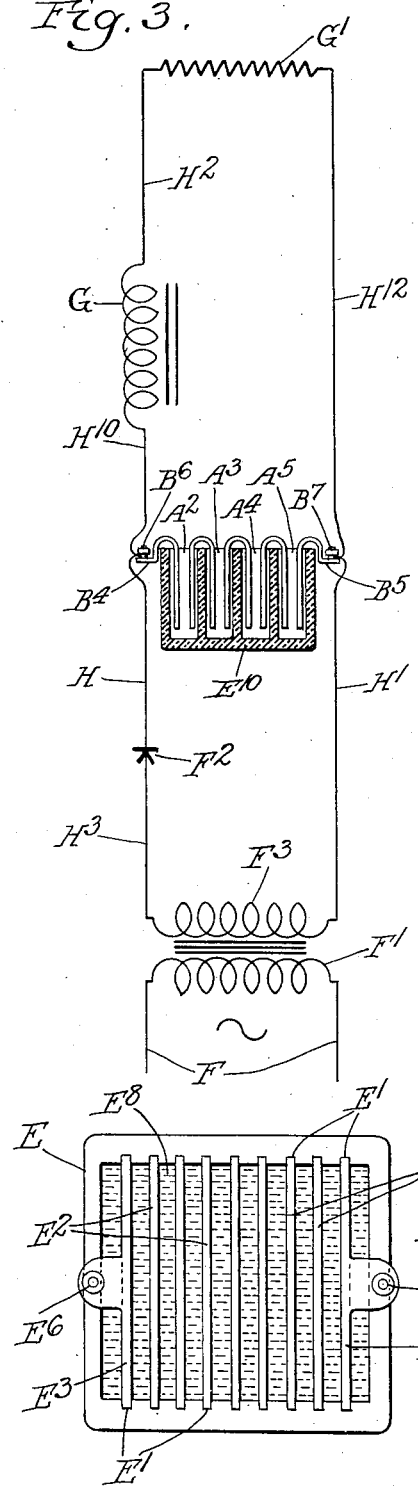
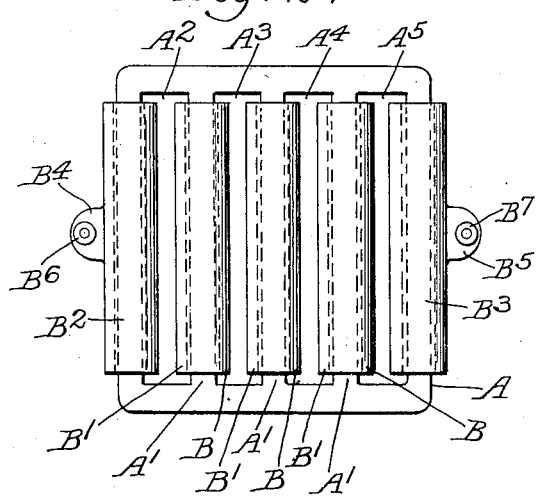
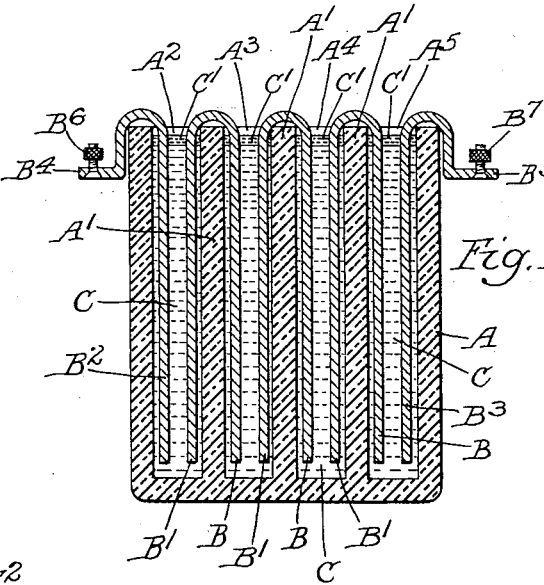
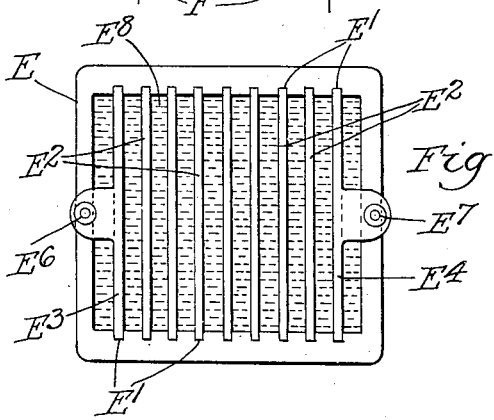
Inventor
Edward F. Andrews
by Parker & Carter
Attorneys.

Patented June 12, 1928.

1,673,434

UNITED STATES PATENT OFFICE.

EDWARD F. ANDREWS, OF CHICAGO, ILLINOIS, ASSIGNOR TO ANDREWS-HAMMOND CORPORATION, OF CHICAGO, ILLINOIS, A CORPORATION OF ILLINOIS.

ELECTROLYTIC CONDENSER.

Application filed November 7, 1927. Serial No. 231,437.

My invention relates to an electrolytic condenser, of the same general type as that disclosed in my prior application 101,347, filed April 12, 1926, which makes possible enormously greater capacity than previous types of condenser, of similar dimensions, particularly at relatively low voltages. One object of my invention is to provide an electrolytic cell adapted to function as a condenser in circuits carrying pulsating, alternating or surging currents, which shall have a relatively high capacity, particularly at low voltages, and which shall be capable of long periods of use or disuse with very little deterioration. A further object is the provision of an electrolytic condenser, one or more of which may be used in connection with one or more inductances, in circuits carrying alternating or pulsating current, to reduce the alternating component to a minimum, thus producing a substantially steady direct current.

A further object is the provision of a material for the plates of an electrolytic condenser of this general type which shall be more durable than plates of pure iron or pure nickel and which can function satisfactorily both as positive and as negative plate, at the same time maintaining a high capacity effect at practical operating voltages. A further object of this invention is to provide a material which shall be more economical and which shall lend itself better to quantity production than the nickel plated steel previously used and at the same time shall compare favorably to this latter material in point of capacity per unit of area and which shall be superior in durability. A further object is the provision of an electrolytic condenser which shall be easy and cheap to manufacture and economical to use.

Other objects will appear from time to time in the course of the specification and claims.

I illustrate my invention more or less diagrammatically in the accompanying drawings, wherein—

Figure 1 is a cross-section of one of my electro-chemical condensers;

Figure 2 is a plan view of the condenser shown in Figure 1;

Figure 3 illustrates one of my electro-chemical condensers connected across a circuit carrying pulsating current; and Figure 4 illustrates a variant and on the whole preferred type of condenser.

Like parts are indicated by like symbols throughout the specification and drawings.

Referring to Figures 1 and 2, the container A is divided by the transverse partitions $A^1$ into separate compartments or cells, $A^2$, $A^3$, $A^4$, $A^5$. Each cell is provided with a negative electrode B and a positive electrode $B^1$. The positive and negative electrodes of adjacent cells may be made continuous. Thus I have illustrated in Figure 1 combined positive and negative electrodes, U-shaped in cross-section, with the transverse partitions $A^1$ positioned between the arms of the U and supporting the electrodes in position.

The end electrodes $B^2$ and $B^3$ are in Figures 1 and 2 illustrated as single and are provided with the terminals $B^4$ $B^4$, $B^5$ $B^5$, which should be formed to permit of an extremely low resistance connection between the circuit and the condenser. I illustrate the binding posts as $B^6$ and $B^7$.

C indicates an electrolyte which is preferably of an alkali metal hydroxide, potassium hydroxide being best except as to cost. Sodium hydroxide is cheaper. Chlorine should be avoided as an impurity. It may consist of an aqueous solution of potassium hydroxide. Other electrolytes may be usable. $C^1$ indicates a thin film of oil floating on the surface of the electrolyte C, which serves to prevent the electrolyte from absorbing carbon dioxide from the air, and also retards evaporation. If the container A is provided with a closed top as is preferable in commercial applications of my device, the oil film $C^1$ may generally be omitted.

I prefer to employ for both positive and negative electrodes a nickel iron or nickel steel alloy. A wide range of proportions of nickel and iron are usable. Many satisfactory alloys are found in the range up to 18 per cent nickel. One quite desirable range is from 8 to 12 per cent nickel. A ten per cent nickel alloy has produced desirable results.

Referring to Figure 2 the compartments $A^2$, $A^3$, $A^4$, $A^5$, are preferably long and narrow, to bring the positive and negative electrodes B, $B^1$ close together and thus to reduce the internal resistance of the cell, and at the same time to provide accommodation for plates of suitable area. The capacity and smoothing effect increases with the plate area. The thinness of the electrodes is limited by the necessity of having them thick enough to be strong and durable, and in the case of those to which connections are made, they must be thick enough to provide ample conductivity. For larger capacities a plurality of electrodes can be connected in parallel in the same cell.

Referring now to Figure 4 I illustrate a variant form of condenser which is thought to be preferable for certain commercial uses. This general type of cell is that described, shown and claimed in the co-pending application 153,488, of Laurens Hammond, filed on December 9, 1926. E indicates a container the inner faces of the sides of which are slotted in parallel as at $E^1$ to receive the metallic sheets $E^2$ which serve at the same time as partitions between adjacent cells, as electrodes for the cells they bound and as conductors connecting the adjacent electrodes. Thus, save for the terminal plates $E^3$ and $E^4$, each plate serves as the positive electrode for one cell and the negative electrode for the adjacent cell. $E^6$ $E^7$ indicate binding posts or any other suitable connecting means for the terminal plates $E^3$ and $E^4$.

Referring now to Figure 3 F indicates a source of alternating current and $F^1$ a transformer for securing the desired voltage. $F^2$ is a rectifier adapted to permit the passage of current through it in one direction only, thereby causing a pulsating direct current to flow in the secondary coil $F^3$ of the transformer $F^1$. $E^{10}$ generally indicates an electrolytic condenser, for example such as shown in Figures 1, 2 or 3, and herein shown as consisting of the four cells $A^2$, $A^3$, $A^4$ and $A^5$, connected across the output of the secondary coil $F^3$ and the rectifier $F^2$.

G indicates a choke coil having a high reactance by comparison to its resistance, connected in series with the load diagrammatically illustrated as $G^1$. The terminals $B^4$ $B^4$ should be connected respectively to the wires H and $H^{10}$ leading to the rectifier $F^2$ and the choke coil respectively. The opposite terminals $B^5$ $B^5$ should be connected respectively to the wires $H^1$ and $H^{12}$ connecting with the secondary coil $F^3$ and the load $G^1$ respectively, the load and the choke coil being connected by the line $H^2$ in the circuit as diagrammatically shown in Figure 3, and the rectifier $F^2$ and the coil $F^3$ being connected by the wire $H^3$.

It will be realized that whereas I have illustrated and described a practical and operative device and circuit, nevertheless many changes may be made without departing from the spirit of my invention, and particularly that I do not wish to be limited to any specific use for my cell or my circuit since the cell may be used in other circuits or for other purposes. Furthermore both cell and circuit may be widely varied without departing from the spirit and intention of my invention. I wish my drawings and description therefore to be taken as in a broad sense illustrative an diagrammatic rather than as limiting me to my precise showing.

The use and operation of my invention are as follows:

My electro-chemical condenser has characteristics which radically differentiate it both from condensers and from batteries. All electrolytic condensers in the past have included positive plates, generally of metal, upon whose surface was formed a layer or film of a relatively non-conducting oxide or hydroxide which served to insulate the conducting surface of the electrode from the electrolyte. This film is capable of withstanding voltages very much in excess of the solution pressure voltages of the electrodes in conjunction with the specific electrolyte. A basically novel feature of my condenser as disclosed herein and in the co-pending application 101,347, above mentioned, is the employment, as a positive electrode in an electrolytic condenser, of a metallic surface which does not become covered with a non-conducting oxide film and in which the break-down voltage is not greatly in excess of the solution pressure of the electrode against the solution.

I may employ a cell having positive and negative electrodes of a nickel iron alloy. One suggested range is an alloy having up to 17 per cent nickel and I find that a range of from 8 to 12 per cent nickel is particularly advantageous. I do not wish to be limited, however, to these specific ranges. I find it advantageous for several reasons to employ a positive electrode or a positive and a negative electrode in my electro-chemical condenser consisting of an alloy of iron and nickel. I have experimented with a wide range of proportions of iron to nickel, and believe that the whole alloy series is at least to some extent effective for this purpose. However those alloys containing a relatively small percentage of nickel are advantageous on account of their relatively low price and have been found to be very suitable for this purpose. The range of alloys having up to 18 per cent of nickel are relatively cheap and usable. The range of alloys containing from 8 to 12 per cent of nickel is particularly advantageous. I do not wish to be limited however to these specific ranges. It is desirable of course to select an alloy which shall be fairly easy to roll and which shall have desirable mechanical properties such as ductility combined with reasonable strength. Certain of the alloys in the range up to 18 per cent of nickel are not well adapted to rolling into sheets. The range from 8 to 12 per cent is, however, good from this point of view and its mechanical properties are satisfactory. An alloy containing ten per cent of nickel and the balance iron including certain minor impurities has been found quite satisfactory from all points of view. The durability of iron nickel alloy both as a positive and negative plate in the solution of an alkali metal hydroxide is extremely good. As a positive plate it is very much better than iron. As a negative plate it is very much better than either nickel or iron. Iron tends to oxidize as a positive plate to a much greater extent than the iron nickel alloy, while nickel as a negative plate under certain conditions of pulsating current disintegrates quite rapidly. The iron nickel alloy remains clean and bright for great lengths of time both as a positive and negative electrode and under very difficult conditions of service. The iron nickel alloy when employed for both positive and negative plates of my condenser gives almost if not fully as high a capacity per unit of area as that obtainable when a positive of pure nickel and a negative of pure iron is employed. There is a great advantage in having both positive and negative plates composed of the same material. In the first place the polarity of the condenser is reversible under these conditions without changing the capacity of the condenser while if an iron negative and a nickel positive is employed if the polarity is changed so that the iron becomes the positive and the nickel the negative the capacity effect will be very greatly reduced. The use of the same material for both plates is also particularly advantageous where the plate is employed as a bi-polar electrode as is shown in the Figure 4 of the drawing. If plates of different materials are used here it is necessary to plate one material upon the other or to otherwise form a composite sheet, the positive face of which is nickel and the negative face of which is iron. If one metal is plated on to the other it is very difficult to secure a closely adherent coating and almost impossible to secure one free from pores. In passing, attention might be called to the fact that in the use of my two electrodes of the same material both remain relatively clean and bright and do not noticeably disintegrate as a result of electrolytic action, which brings out clearly the difference between my electro-chemical condenser and a storage battery.

In the preparation of the plates they are preferably etched. The sheets may be etched as they are supplied by the rolling mills. They can be etched either by immersing the plate in a suitable etching solution such as 7 per cent sulphuric acid, the bath being maintained in a temperature in the vicinity of 120 degrees F., or they can be etched in a similar solution while an electric current is being passed through the sheet which forms one or more of the electrodes in the etching cell. The etching of iron nickel alloy electrodes apparently increase their capacitative effect. The roll stock supplied from the rolling mills is of a dark gray color with a considerable scale. When etched as above described in 7 per cent sulphuric acid the scale is removed and the metal comes out quite white looking, much like pure nickel. It should be of course washed thoroughly to remove all acid. The ten per cent nickel alloy has a relatively small tendency to rust.

I claim:

1. In an electrolytic condenser adapted for use in electric circuits carrying alternating or pulsating currents, which includes electrodes and an electrolyte, a metallic positive electrode formed of an alloy of nickel and iron.

2. In an electrolytic condenser adapted for use in electric circuits carrying alternating or pulsating currents, which includes electrodes and an electrolyte, metallic positive and negative electrodes formed of a nickel iron alloy.

3. In an electrolytic condenser adapted for use in electric circuits carrying alternating or pulsating currents, which includes electrodes and an electrolyte, a positive electrode having an effective metallic surface of a nickel iron alloy.

4. In an electrolytic condenser adapted for use in electric circuits carrying alternating or pulsating currents, which includes electrodes and an electrolyte, a metallic positive electrode formed of an alloy of nickel and iron, including 17 per cent or less of nickel.

5. In an electrolytic condenser adapted for use in electric circuits carrying alternating or pulsating currents, which includes electrodes and an electrolyte, a metallic positive electrode formed of an alloy of nickel and iron, including from 8 to 12 per cent of nickel.

6. In an electrolytic condenser adapted for use in electric circuits carrying alternating or pulsating currents, which includes electrodes and an electrolyte, metallic positive and negative electrodes formed of a nickel iron alloy, including 17 per cent or less of nickel.

7. In an electrolytic condenser adapted for use in electric circuits carrying alternating or pulsating currents, which includes electrodes and an electrolyte, metallic positive and negative electrodes formed of a nickel iron alloy, including from 8 to 12 per cent of nickel.

8. In an electrolytic condenser adapted for use in electric circuits carrying alternating or pulsating currents, which includes electrodes and an electrolyte, a metallic bipolar electrode formed of an alloy of nickel and iron.

9. In an electrolytic condenser adapted for use in electric circuits carrying alternating or pulsating currents, which includes electrodes and an electrolyte, a metallic bi-polar electrode formed of an alloy of nickel and iron, including 17 per cent or less of nickel.

10. In an electrolytic condenser adapted for use in electric circuits carrying alternating or pulsating currents, which includes electrodes and an electrolyte, a metallic bi-polar electrode formed of an alloy of nickel and iron, including from 8 to 12 per cent of nickel.

11. In an electrolytic condenser adapted for use in electric circuits carrying alternating or pulsating currents, which includes electrodes and an electrolyte, a metallic bi-polar electrode consisting of a thin sheet of an alloy of nickel and iron.

12. In an electrolytic condenser adapted for use in electric circuits carrying alternating or pulsating currents, which includes electrodes and an electrolyte, a plurality of metallic bi-polar electrodes formed of an alloy of nickel and iron.

13. In an electrolytic condenser adapted for use in electric circuits carrying alternating or pulsating currents, which includes electrodes and an electrolyte, a plurality of metallic bi-polar electrodes formed of an alloy of nickel and iron, a container for said electrodes and a separate body of electrolyte between each pair of said electrodes, the electrodes being adapted to serve as partitions between the cells so formed.

14. In an electrolytic condenser adapted for use in electric circuits carrying alternating or pulsating currents, which includes electrodes and an electrolyte, a positive electrode, the effective portion of which consists of a surface of an alloy of nickel and iron.

15. In an electrolytic condenser adapted for use in electric circuits carrying alternating or pulsating currents, which includes electrodes and an electrolyte, a positive electrode, the effective portion of which consists of a surface of an alloy of nickel and iron, and a plurality of bi-polar electrodes formed of an alloy of nickel and iron.

16. In an electrolytic condenser adapted for use in electric circuits carrying alternating or pulsating currents, which includes electrodes and an electrolyte, a positive electrode, the effective portion of which consists of a surface of an alloy of nickel and iron, a container for said electrodes and a separate body of electrolyte between each pair of said electrodes, the electrodes being adapted to serve as partitions between the cells so formed.

17. In an electrolytic condenser which includes electrodes and an electrolyte, a solid metallic positive electrode, the essential portion of which includes a nickel iron alloy.

18. In an electrolytic condenser which includes electrodes and an electrolyte, a solid metallic bi-polar electrode, the essential portion of which includes a nickel iron alloy.

Signed at Chicago, county of Cook and State of Illinois, this 5th day of November, 1927.

EDWARD F. ANDREWS.